US006776550B2

(12) United States Patent
Roca

(10) Patent No.: US 6,776,550 B2
(45) Date of Patent: Aug. 17, 2004

(54) REMOVABLE INSERT FOR A BINDER

(75) Inventor: Robert John Roca, Culver City, CA (US)

(73) Assignee: Roca Productions, Inc., Culver City, CA (US)

(*) Notice: Subject to any disclaimer, the term of this patent is extended or adjusted under 35 U.S.C. 154(b) by 0 days.

(21) Appl. No.: 10/155,223

(22) Filed: May 28, 2002

(65) Prior Publication Data

US 2003/0223804 A1 Dec. 4, 2003

(51) Int. Cl.[7] .......................... B32B 3/10; B42F 13/00; B42F 13/14; B42D 5/04

(52) U.S. Cl. .................................... 402/802; 24/343

(58) Field of Search ............................ 402/80 R, 80 P, 402/3, 80 L, 79, 70, 73, 801, 78, 500; 281/7, 42, 9, 21.1, 2; D19/27, 32, 33; 283/61; 428/99, 100, 596, 34.1; 116/234, 236, 238, 239; 24/34 B

(56) References Cited

U.S. PATENT DOCUMENTS 818,130 A * 4/1906 Swan .......................... 402/79
852,871 A * 5/1907 Cohn .......................... 402/70
1,107,351 A * 8/1914 Proudfit ....................... 402/79
3,719,161 A * 3/1973 Wegner ...................... 116/240
4,193,704 A * 3/1980 Miller et al. .................. 402/19
4,430,015 A * 2/1984 Nerlinger ..................... 402/79
4,595,309 A * 6/1986 Chinchar .................. 402/80 R
4,940,353 A * 7/1990 Osono et al. ................. 402/79
5,015,114 A * 5/1991 Miller ........................... 402/4
5,219,239 A * 6/1993 Bianco ........................ 402/79
5,405,169 A * 4/1995 Schwartz ..................... 281/16
5,407,231 A * 4/1995 Schwartz ..................... 281/16
5,597,256 A * 1/1997 Burton et al. .................. 402/4
D393,483 S * 4/1998 Covey ......................... D19/32
D404,424 S * 1/1999 Covey ......................... D19/32
5,915,873 A * 6/1999 Karlis .......................... 402/79
6,086,281 A * 7/2000 Covey .......................... 402/79
6,109,812 A * 8/2000 Welch ........................... 402/3
6,196,750 B1 * 3/2001 Hansen ........................ 402/79
6,261,021 B1 * 7/2001 Pfanner et al. ............... 402/79
D457,560 S * 5/2002 Grbic .......................... D19/32
2003/0165644 A1 * 9/2003 Meade et al. .............. 428/34.1

FOREIGN PATENT DOCUMENTS

DE 474281 * 3/1929 .................. 402/79
DE 521358 * 3/1931 .................. 402/79

* cited by examiner

*Primary Examiner*—A. L. Wellington
*Assistant Examiner*—Mark T. Henderson
(74) *Attorney, Agent, or Firm*—Stevens, Davis, Miller & Mosher, LLP

(57) ABSTRACT

A removable insert adapted for use with a spiral or other ring-type binder includes a thin body member, a hooking element connected to, or integral with, the body member which defines a longitudinally extending recess configured to receive at least a first page retaining member, and a fastener connected to, or integral with, the body member configured to detachably secure the body member to a second page retaining member. The hooking element includes a journal bearing about which the first page retaining member may be rotated. The fastener includes a constricted channel adjacent to the edge of the insert and an enlarged portion disposed inwardly from the edge.

32 Claims, 12 Drawing Sheets

REMOVABLE INSERT FOR A BINDER

I. FIELD OF THE INVENTION

The present invention relates generally to spiral and other ring-type binders and more particularly to bookmarks, rulers, post-it holders, paper pages and other apparatus configured for removable insertion in spiral or other ring-type binders.

II. BACKGROUND OF THE INVENTION

A great many spiral and other ring-type binders have been developed for retaining a plurality of separate pages or other loose-leaf elements therein. These ring-type binders typically include a plurality of loose-leaf page retaining members positioned longitudinally between opposing ends of such binders. The page retaining members are configured to extend through corresponding apertures in the preferred loose-leaf elements thereby retaining the loose-leaf elements in the ring-type binder.

In some ring-type binders, the page retaining members include two separable members which, then adjoined, form a loop for retaining loose-leaf elements. These separable page retaining members are configured to permit the user to insert loose-leaf elements in the binder and to remove or replace loose-leaf elements retained therein.

In other ring-type binders, the page retaining members do not separate in a manner which enables the user to insert or replace loose-leaf elements. These ring-type binders may take the form of a conventional spiral or other notebooks wherein the loose leafs are fixed therein using a continuous wire member configured in a helix or other manner so as to define a plurality of loose-leaf page retaining members.

In many instances, it is desirable to provide these binders with a bookmark, ruler, post-it holder, a paper page, stencil or other device which may be removably inserted therein. A variety of removable rulers and other inserts are presently available which include a straight longitudinal edge having one or more apertures adjacent thereto configured to receive the page retaining members of a conventional three or six-ring binder. However, there are several problems with these removable inserts. First of all, such inserts can only be used with ring-type binders having separable page retaining members. Secondly, the placement of such inserts within such ring-type binders can only be accomplished after considerable manipulation of both the binder and the insert. The user must first manipulate the page retaining members, or a lever connected thereto, so as to cause the page retaining members to separate. Thereafter, the user must position the removable insert over the page retaining members so as to align each aperture over its corresponding page retaining member. After this is done, the removable insert must be lowered onto the binder whereupon the page retaining members are slidably received by the apertures. Thereafter, the operator must again manipulate the page retaining members or the levers connected thereto so as to effect closure of the page retaining members.

Thus, it is seen that such removable inserts are not easily used by the operator. Additionally, it is seen that such removable inserts are not insertable into spiral or other ring-type binders wherein the page retaining members are not configured for insertion or removal of loose-leaf elements.

Some of the foregoing problems have been overcome by providing a removable insert in the form of a thin flexible body member having a straight longitudinal edge with three or six recesses therein. The recesses are positioned to correspond with the page retaining members of a conventional separable ring-type binder. The recesses include an enlarged portion disposed inwardly from the longitudinal edge for receiving the corresponding page retaining member and a constricted channel adjacent the longitudinal edge through which the corresponding page retaining member passes by flexion of the portion of the insert defining the constricted channel.

In order that this second type of insert be fixed securely within a conventional separable ring-type binder, the insert must be positioned within the binder such that each recess is aligned with its corresponding page retaining member. Thereafter, the portions of the insert defining each recess must be manipulated so as to squeeze the page retaining members into the enlarged portions of the corresponding recesses.

While this second type of insert can be removed from a ring-type binder without manipulation of the separable page retaining members and thus may be easier to use than the first type of insert described above, the user must nonetheless exercise considerable manual dexterity to effect placement of the insert on a ring-type binder.

Notably, this second type of removable insert (which typically includes three or six recesses corresponding to the page retaining member of a conventional separable three or six-ring binder) is not insertable in conventional double spiral or other single spiral binders wherein the number of page retaining members positioned adjacent the longitudinal edge of the insert exceeds the number of recesses provided therefore. This is due the lack of clearance (discussed hereinafter) provided for the additional page retaining members.

It would thus be desirable to provide a removable insert which can be used with all types of ring-type binders and which can be easily inserted in such binders without requiring any difficult manipulation of the removable insert or the ring-type binder.

III. SUMMARY OF THE INVENTION

It is therefore a primary object of the present invention to disclose and provide a removable insert adapted for use with all types of ring-type binders.

It is a further object of the present invention to disclose and provide such a removable insert which can be inserted into all types of ring-type binders without requiring any difficult manipulation thereof.

It is also an object of the present invention to disclose and provide such a removable insert which can be manufactured at a low cost.

Generally stated, a removable insert that satisfies the foregoing objects includes a body member which is sufficiently thin to be insertable in a ring-type binder, a hooking element connected to, or integral with, the body member which defines a longitudinally extending recess configured to receive at least a first page retaining member, and a fastener connected to, or integral with, the body member configured to detachably secure the body member to a second page retaining member.

As a feature of the present invention, the longitudinal extending recess in the hooking element is configured to receive the first page retaining member in a loose fitting relation.

As another feature of the present invention, the longitudinally extending recess includes a divergent opening for receiving a first page retaining member within the recess.

As another feature of the present invention, the hooking element includes a journal bearing about which the insert may be rotated.

As an additional feature of the present invention, the fastener is spaced apart at a predetermined distance from the journal bearing such that, upon rotation of the insert about the journal bearing, the fastener may be moved into engagement with a second page retaining member.

As yet another feature of the present invention, the fastener defines a recess, including an enlarged portion for receiving the second page retaining member in a loose fitting relation and a constricted channel adjacent thereto through which the second page retaining member may only pass by flexion of the fastener, the second page retaining member, or both.

As yet another feature of the present invention, the constricted channel defined by the fastener diverges at the end adjacent the longitudinal edge to facilitate insertion of the second page retaining member into the enlarged portion of the fastener.

As yet a further feature of the present invention, the constricted channel defined by a fastener diverges at the end adjacent the enlarged portion of the fastener to facilitate the removal of the second page retaining member from the enlarged portion of the fastener.

As yet another feature of the present invention, the hooking element and the fastener each extend laterally from a longitudinal edge of the insert so as to provide a clearance for any page retaining members positioned between the hooking element and the fastener when the insert is in an assembled relation to a preferred binder.

As yet another feature of the present invention, the hooking element and fastener are integrally formed with the thin body member.

As yet one more feature of the present invention, the body member, the hooking element and the fastener are molded or otherwise formed from a flexible material such as plastic or rigid vinyl.

As yet another feature of the present invention, the hooking element and the fastener can be formed from mylar or similar material that is bonded to plain paper.

As yet another feature of the present invention, the hooking element and the fastener can be formed from mylar or similar material that is bonded to a sheet of plain paper.

Advantageously, a removable insert in accordance with the present invention may be easily inserted into all types of ring-type binders, e.g., 3-ring or double spiral ring binders. The insert generally comprises a thin body and a first page retaining member and a fastener. The thin body typically has a thickness of about between 0.015 and 0.030 inches. However, the thin body may have a thickness of up to 0.0625 inches in some circumstances. Moreover, the thin body may be a paper page as thin as 0.003 inches having reinforcements.

The operator need only hook the hooking element around the first page retaining member so as to position the first page retaining member within the longitudinally extending recess defined by the hooking element and thereafter rotate the insert about the first page retaining member so as to bring the fastener into engagement with a second page retaining member. While the fastener must thereafter be manipulated so as to position the second page retaining member within the enlarged portion of the fastener, the operator need only manipulate a single fastener rather than plurality of such fasteners to effect placement of the insert in assembled relation to a preferred ring-type binder.

For example, the removable insert may be positioned in assembled relation to a ring-type binder by hooking the hooking element around the first page retaining member so as to position the first page retaining member within the journal bearing. Thereafter, the insert is rotated and/or otherwise manipulated so as to bring the fastener into engagement with a second page retaining member. Once the fastener is adjacent the second page retaining member, the insert is manipulated so as to cause the second page retaining member to pass through the constricted channel into the enlarged portion of the fastener by flexion of the fastener, the second page retaining member, or both.

It is submitted that those skilled in the art will obtain a better understanding of the construction and mode of operation of the present invention as well as become aware of the additional advantages and objects thereof from a consideration of the following description of the preferred exemplary embodiments of the present invention taken in combination with the accompanying drawings which are described hereinafter.

IV. BRIEF DESCRIPTION OF THE DRAWINGS

V. DETAILED DESCRIPTION OF PREFERRED EXEMPLARY EMBODIMENT(S)

Figure 1:
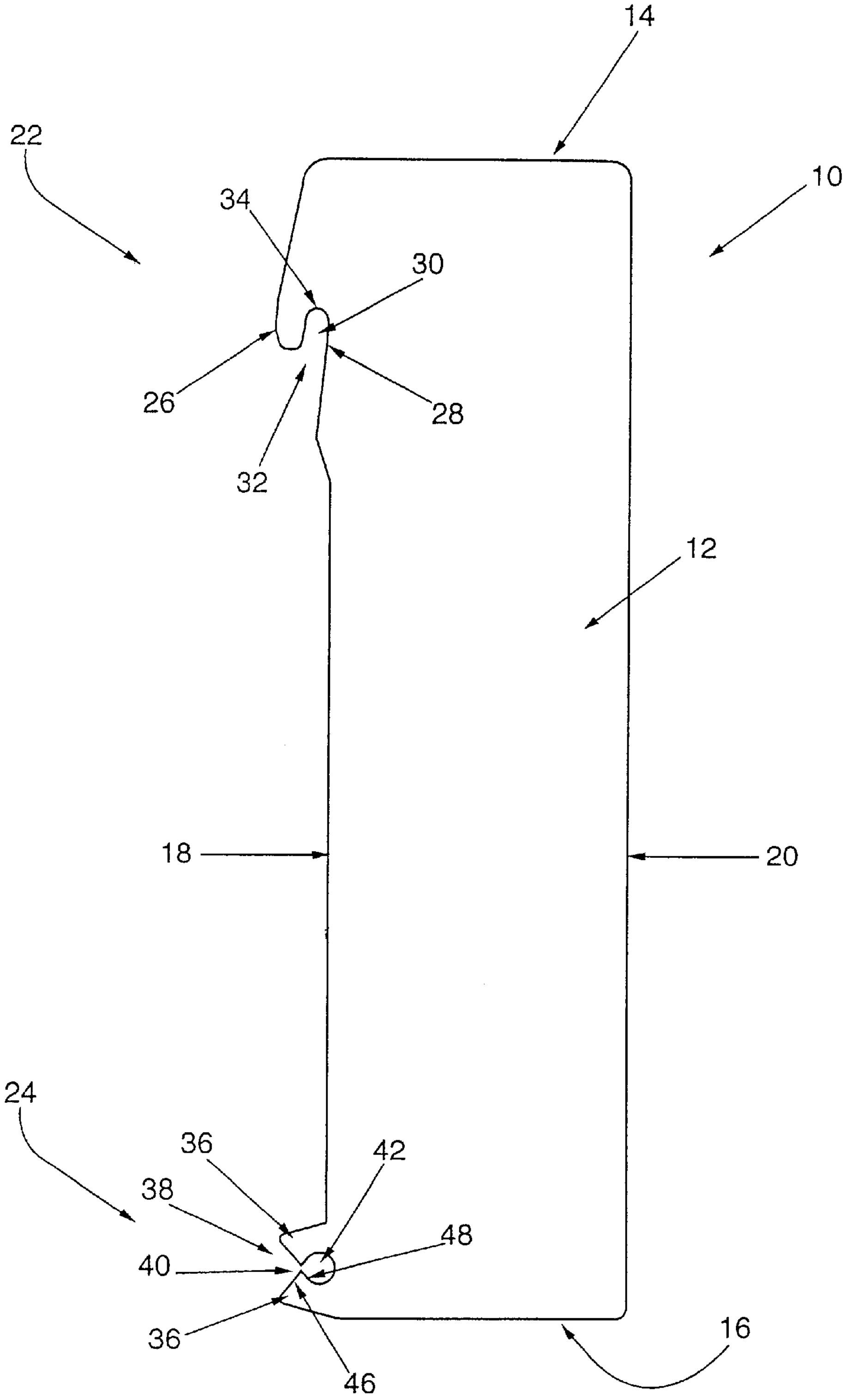
FIG. 1 is a plan view of a preferred exemplary removable insert in accordance with the present invention.
Figure 2:
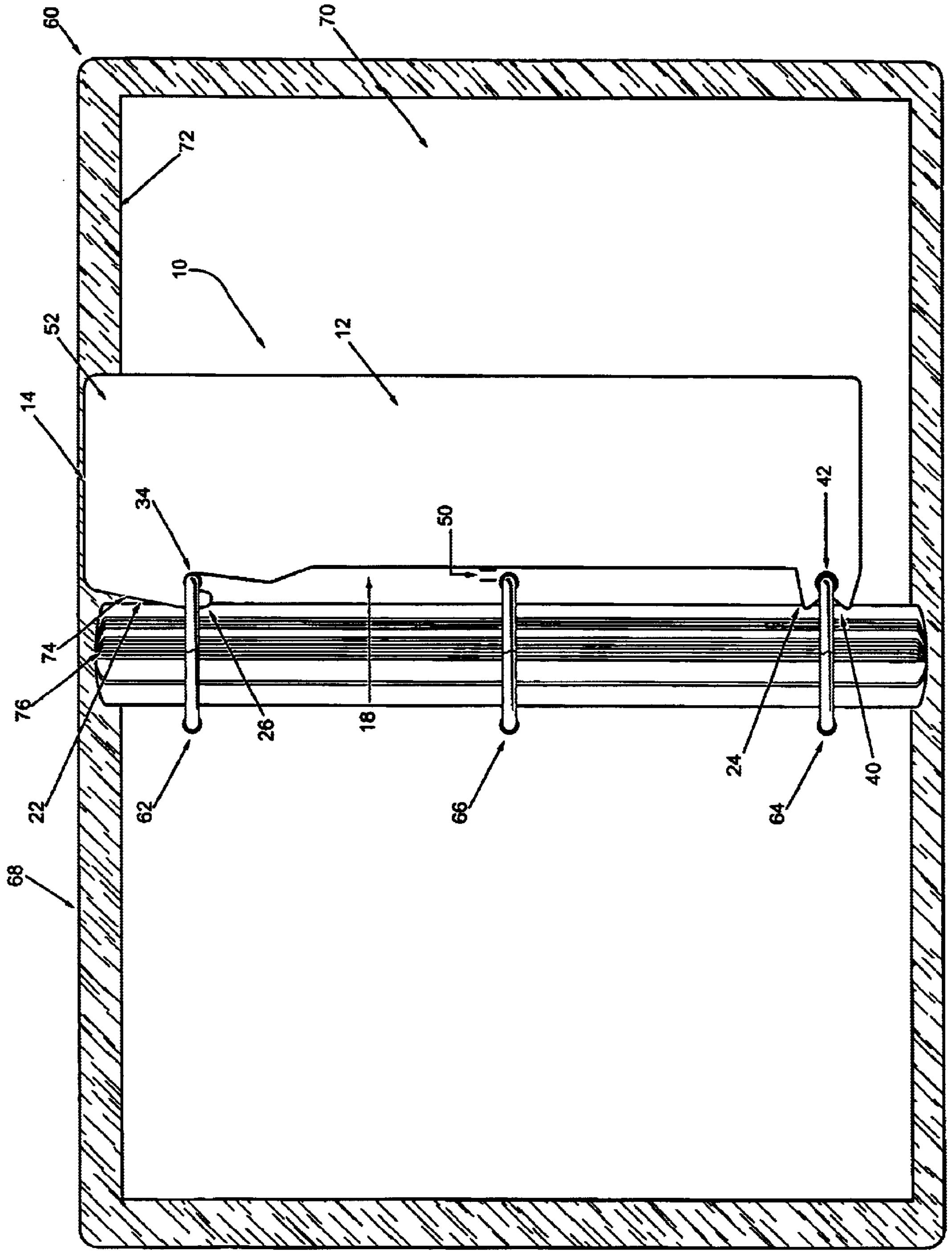
FIG. 2 is a plan view of the preferred exemplary removable insert of FIG. 1 shown in assembled relation to a conventional three-ring type binder.

A first preferred exemplary embodiment of a removable insert in accordance with the present invention is shown generally at 10 in FIGS. 1–2. Referring initially to FIG. 1, the removable insert includes a thin body member 12 having first and second ends 14 and 16 and longitudinal edges 18 and 20 extending therebetweeen. The removable insert includes a hooking element 22 disposed towards the first end 14 and a fastener 24 disposed towards the second end 16, each of which extend laterally from longitudinal edge 18.

The hooking element 22 includes a downwardly extending arm 26 which, together with portion 28 of longitudinal edge 18, defines longitudinal extending recess 30. Longitudinally extending recess 30 includes a divergent opening 32 for receiving a first page retaining member such as shown at 62 in FIG. 2. Recess 30 also includes an arcuate journal bearing 34 which limits the downward movement of the insert when the hooking element 22 is positioned over a first page retaining member and about which insert 10 may be rotated in order that fastener 24 may be brought into engagement with a second page retaining member such as shown at 64 in FIG. 2.

Fastener 24 includes a pair of laterally extending fingers 36 which together define a recess 38 which includes a constricted channel 40 adjacent longitudinal edge 18 and an enlarged portion 42 adjacent thereto disposed inwardly from longitudinal edge 18. Constricted channel 40 is configured such that the second page retaining member of the preferred ring-type binder may only pass therethrough into the enlarged portion 42 by flexion of the fastener 24, the second page retaining member, or both.

As best shown in FIG. 1, constricted channel 40 includes a first end 46 adjacent longitudinal edge 38 which diverges to facilitate insertion of a second page retaining member into the enlarged portion 42 of the fastener 40 and a second end 48 adjacent the enlarged portion 42 which diverges to facilitate the removal of the second page retaining member from the enlarged portion 42 of the fastener 24.

In FIG. 2 the removable insert 10 is positioned in assembled relation to a conventional three ring-type binder such as shown generally at 60 in FIG. 2 by hooking the arm 26 around page retaining member 62 so as to position the page retaining member within journal bearing 34. Thereafter, the insert 10 is rotated and/or otherwise manipulated so as to position the fastener 24 adjacent a page retaining member 64, the insert 10 is manipulated so as to cause the page retaining member 64 to pass through the constricted channel 40 into the enlarged portion 42 of the fastener 24. The portion of the fastener 24 defining the constricted channel 40 is sufficiently flexible so as to permit an inflexible page retaining member such as shown at 64 to pass therethrough. It is preferable that fastener 24 be formed from a flexible plastic or other suitable material having sufficient resiliency such that, after flexing to receive the page retaining member 64, the material rebounds so as to define the constricted channel 40 as shown in FIGS. 1–2.

Advantageously, fastener 24 is spaced apart at a predetermined distance from the journal bearing 34 such that, upon rotation or other manipulation of insert 10 about the journal bearing 34, the page retaining member 64 may be easily positioned within constricted channel 40.

As best shown in FIG. 2, arm 26 is configured for slidable insertion downwardly through page retaining member 62 in a loose fitting relation. Similarly, journal bearing 34 and enlarged portion 42 are each configured to receive page retaining members 62 and 64 in a loose fitting relation thereby permitting the insert to slide freely along the axis of the page retaining members 62 and 64 when the operator turns to a preferred location within the binder. It is preferable that hooking element 22 and fastener 24 extend laterally from longitudinal edge 18 sufficiently to provide a clearance 50 for any page retaining members such as shown generally at 66 positioned between the hooking element 22 and the fastener 24 when the insert 10 is in assembled relation to the binder 60.

It may also be preferable to provide insert 10 with a protruding tab such as shown generally at 52. Tab 52 extends upwardly from the first end 14 of the thin body member 12 beyond perimetral edge 72 of an adjacent loose-leaf element such as shown generally at 70 without protruding beyond the perimetral edges of binder 60. Alternatively, tab 52 can be configured to extend beyond the upper perimetral edge 68 of binder 60.

As best shown in FIG. 2, edge 18 of insert 10 preferably includes an offset 74 to provide clearance for the page release mechanism 76.

The removable insert of FIGS. 1–2 is preferably integrally molded or otherwise formed from a flexible plastic, rigid vinyl, acrylic, metallic or other suitable material having a thickness of about between 0.015 and 0.030 inches. However, the removable insert may be a thin body having a thickness of up to 0.0625 inches in some circumstances.

Figure 3:
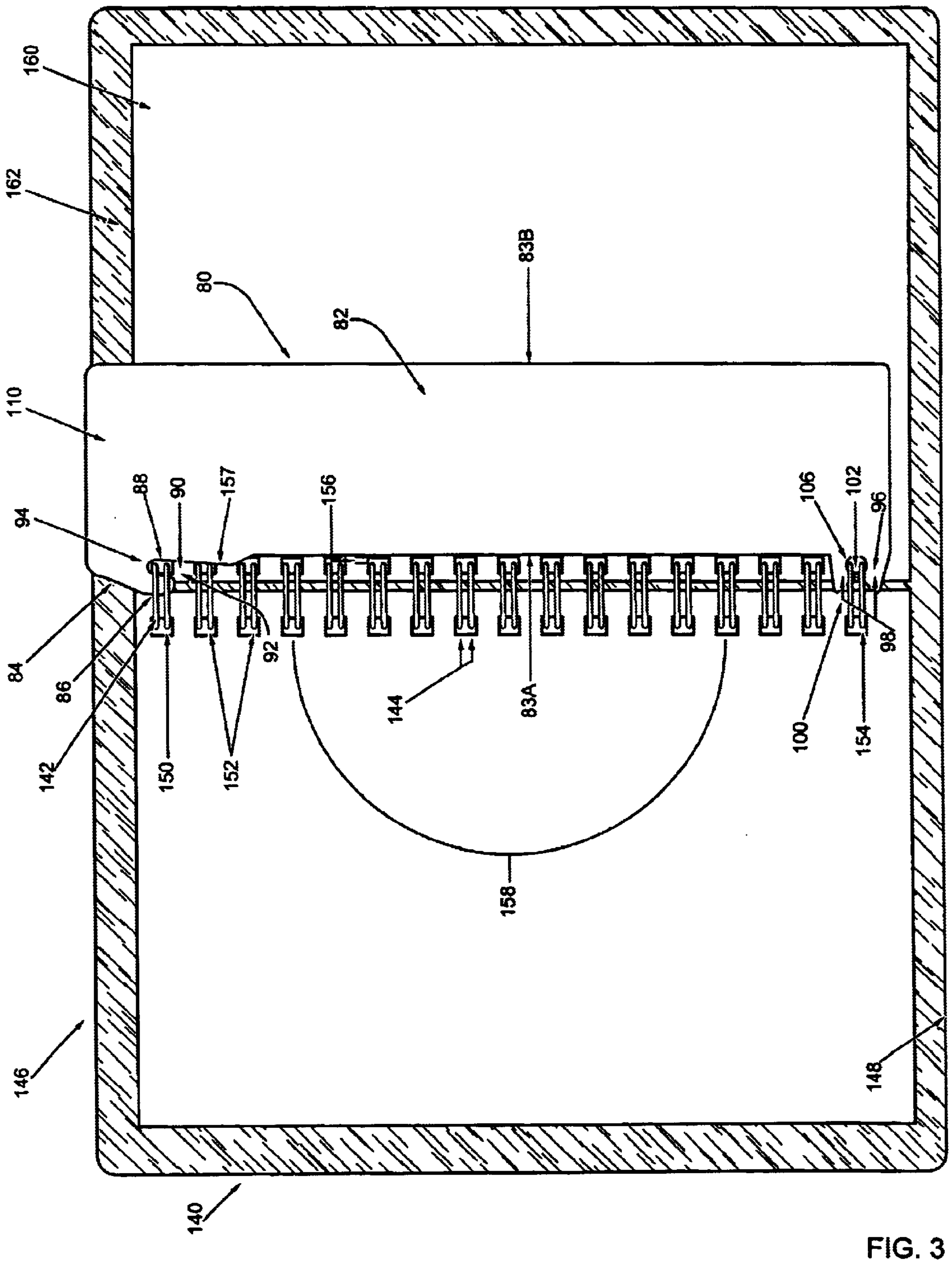
FIG. 3 is a plan view of a second preferred exemplary removable insert shown in assembled relation to a conventional multi-ring binder wherein each page retaining member is formed from a continuous wire or plastic member.

Referring now to FIG. 3, a second preferred exemplary embodiment of a removable insert is shown generally at 80 in assembled relation to a multi-ring binder shown generally at 140. The spiral binder 140 includes a continuous thin wire or plastic member 142 which is configured to define a plurality of double-ring loose-leaf page retaining members 144 positioned longitudinally between opposing ends 146 and 148 of the binder 140. Each double-ring member 144 is configured to cooperate with a corresponding aperture in a loose-leaf element (such as shown generally at 160 in FIG. 3) which is typically positioned within such a binder.

Removable insert 80 includes a thin body member 82, hooking element 84 and fastener 96. The hooking element 84 includes a downwardly extending arm 86 which, together with portion 88 of longitudinal edge 104, defines longitudinal extending recess 90 having a divergent opening 92 for receiving page retaining member 150. The upper portion of recess 90 is defined by journal bearing 94 about which the insert 80 may be rotated or otherwise manipulated. In some embodiments, recess 90 will receive at least one additional page retaining member such as shown at 152 in FIG. 3.

Insert 80 also includes fastener 96. Fastener 96 includes a pair of laterally extending fingers 98 which together define a recess 100 which includes a constricted channel 102 adjacent longitudinal edge 104 of the insert 80 and an enlarged portion 106 disposed inwardly from longitudinal edge 104. Each finger 98 is configured so as to be insertable between adjacent page retaining members. Each constricted channel 102 is configured to receive a page retaining member such as shown generally at 154 in FIG. 3.

Insert 80 is easily inserted into multi-ring binder 140. The operator need only hook the downwardly extending arm 86 around the page retaining member 150 so as to position the page retaining member 150 within the journal bearing 94 and thereafter rotate or otherwise manipulate the insert about page retaining member 150 so as to bring fastener 96 into engagement with page retaining members 154. Notably, wire member 142 is configured such that each ring of each page retaining member 154 flexes towards the other ring of such member so as to enable page retaining member 154 to pass through constricted channel 102 even if fastener 96 is substantially inflexible. Those skilled in the art will thus understand that fastener 96 (and insert 80 in its entirety) may be formed from a substantially inflexible material if the page retaining members are sufficiently flexible to pass through constricted channel 102.

Like the removable insert shown in FIGS. 1–2, removable insert 80 shown in FIG. 3 is configured to define a clearance 156 for the page retaining members 158 positioned between the hooking element 84 and the fastener 96 when the insert 80 is in assembled relation to the binder 140.

Optionally, insert 80 may include shoulder 157 which, as shown in FIG. 3, extends outwardly from edge 104. Shoulder 157 is configured so as to press gently against at least one page retaining member 152 when insert 80 is positioned within binder 140 as described above. While the gentle pressure of shoulder 157 against page retaining member 152 stabilizes the position of the insert relative to the binders, the pressure is not so great as to impede the insert from sliding freely along the axis of the page retaining members when the operator turns to a preferred location within the binder.

Removable insert 80 also includes a protruding tab 110. Tab 110 extends upwardly from the body member 82 beyond the upper perimetral edge 162 of the adjacent loose-leaf element 160 but does not extend (though it may) beyond the perimetral edges of the multi-ring binder 140.

Figure 4:
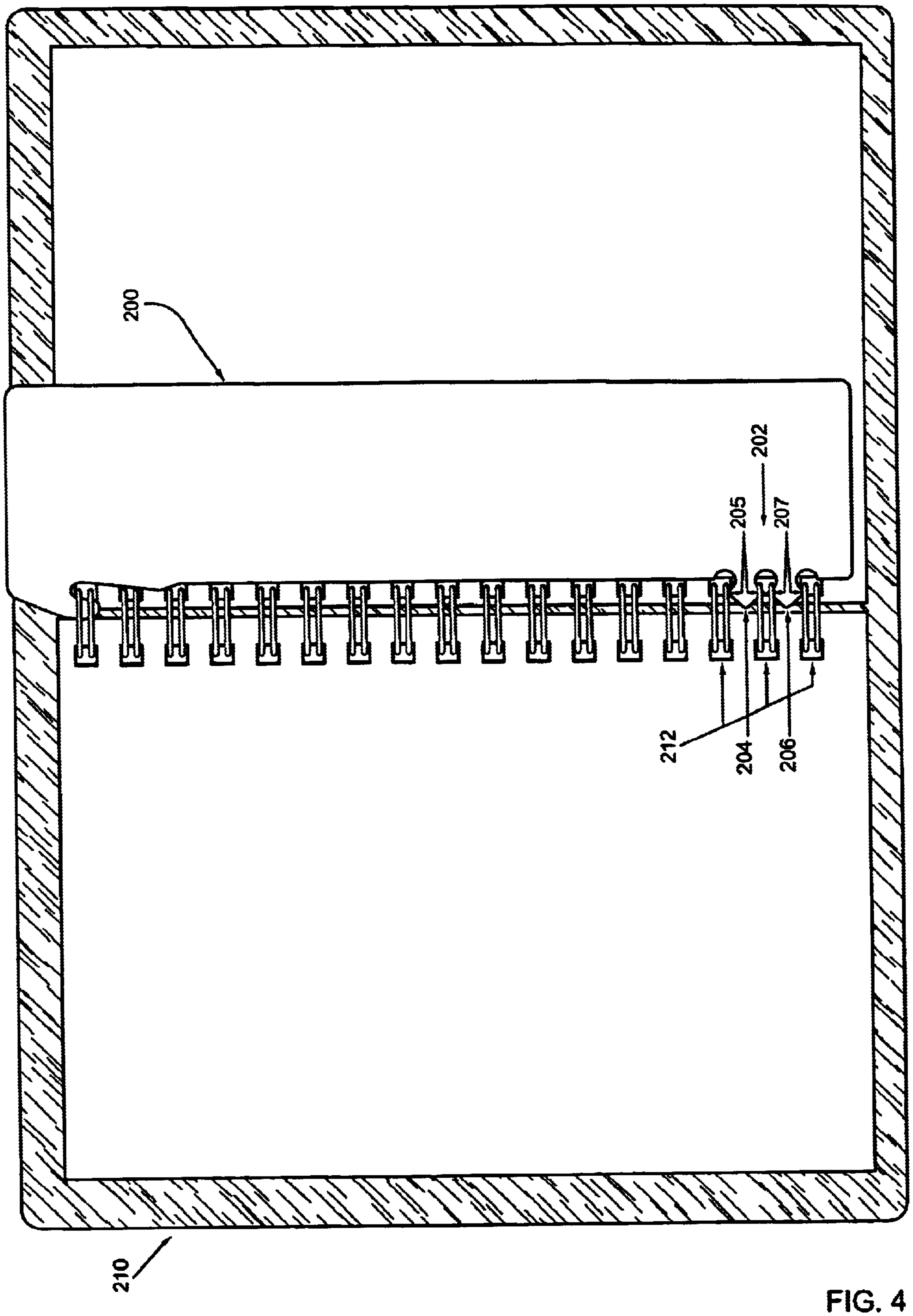
FIG. 4 is a plan view of a third preferred exemplary removable insert shown in assembled relation to a conventional multi-ring binder wherein each page retaining member is formed from a continuous wire or plastic member.

Referring now to FIG. 4, a third preferred exemplary embodiment of a removable insert is shown generally at 200 in assembled relation to a multi-ring binder shown generally at 210. In this preferred embodiment, fastener 202 includes two laterally extending fingers 204 and 206 each configured to simultaneously engage a pair of immediately adjacent page retaining members 212 in loose fitting relation as shown in FIG. 4. As can be seen in FIG. 4, finger 204 includes a pair of opposing triangular-shaped detents 205 and finger 206 includes a pair of opposing triangular-shaped detents 207. Preferably, the maximum distance between the ends of each detent on a single finger be only slightly smaller than the distance between any two immediately adjacent page retaining members 212 thereby limiting the deflection required of a fastener or page retaining member to effect insertion or removal of insert 200 from binder 210. Notably, the triangular shape of each detent serves to reduce the finger surface area which must engage a page retaining member during insertion and removal of insert 200 from binder 210. It is also noted that at the base of each finger is less than the distance between any two immediately adjacent page retaining members 212 thereby ensuring the preferred loose fitting relation between insert 200 and binder 210.

Figure 5:
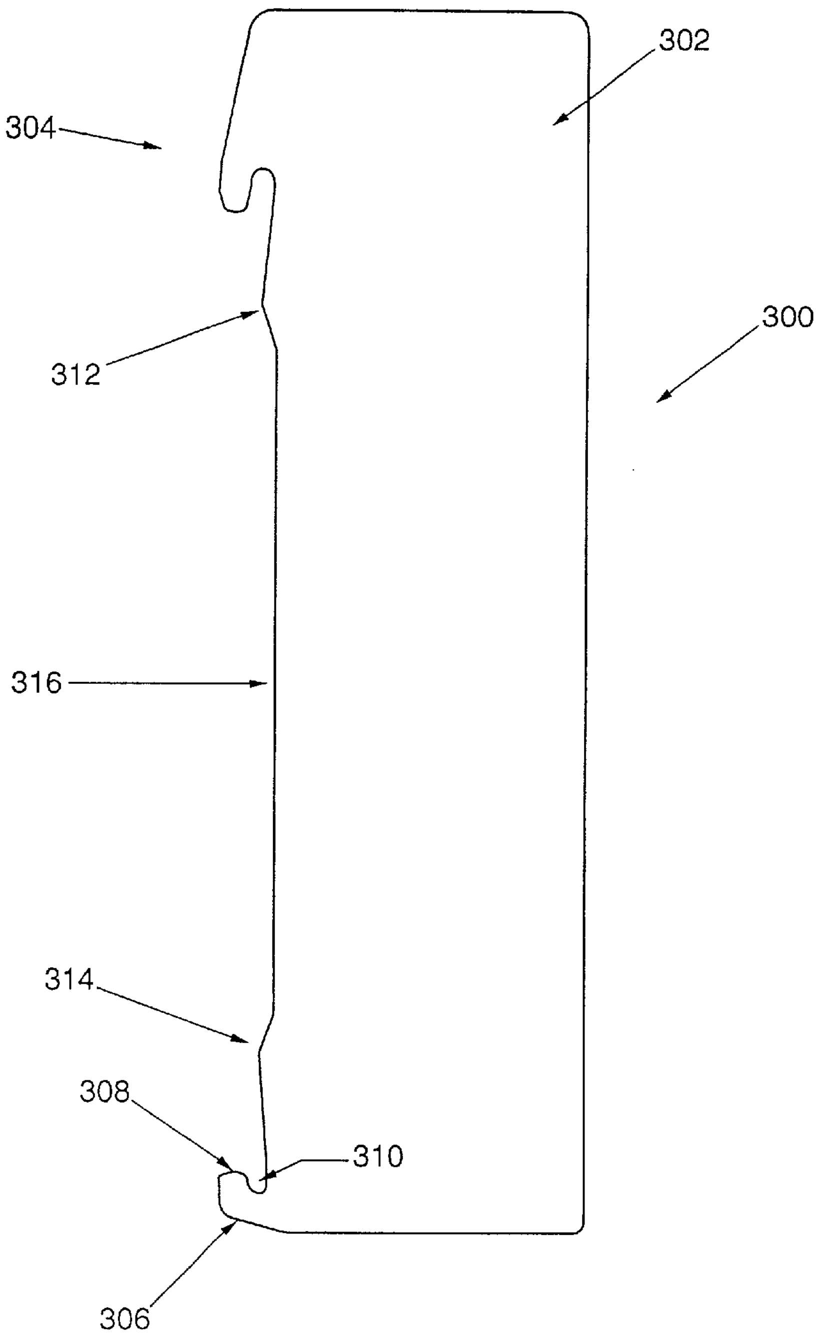
FIG. 5 is a plan view of a fourth preferred exemplary removable insert in accordance with the present invention.

Referring now to FIG. 5, a fourth preferred exemplary embodiment of a removable insert is shown generally at 300. Like the embodiments described above, removable insert 300 includes a thin body member 302, a hooking element 304 and a fastener 306. In this embodiment, however, fastener 306 is comprised of a single laterally extending finger which includes a detent 308 which engages a page retaining member during the insertion and removal of insert 300 from a binder. Fastener 306 is configured to define recess 310 for receiving a page retaining member in loose fitting relation when the insert 300 is in assembled relation to a binder. Notably, detent 308 is somewhat rounded (rather than squared off) thereby facilitating the insertion and removal of insert 300. Those skilled in the art will understand that fastener 306 may also be provided with a detent on its opposing side so that fastener 306 simultaneously engages a pair of page retaining members in loose fitting relation.

As with the previous embodiments, insert 300 is inserted into a multi-ring binder by positioning a page retaining member within the recess of the hooking element 304 and thereafter rotating or otherwise manipulating the insert about the page retaining member in the manner described above.

Optionally, insert 300 may include a pair of shoulders 312 and 314 which, as shown in FIG. 5, extends outwardly from edge 316. Shoulders 312 and 314 are each configured so as to press gently against at least one page retaining member when insert 300 is positioned within a binder as described above.

In some instances, the preferred insert will be comprised of a single sheet or strip of material which will function as a removable bookmark, ruler, stencil, divider sheet or removable paper page or the like as noted above. In other instances, it may be desirable that the removable insert be comprised of multiple pages, e.g., a notepad or address book, or include electronic capabilities, e.g., an electronic organizer or calculator. In such instances, the preferred insert would include means for attaching a notepad, electronic organizer or other device thereto or, in the alternative, would be integrally formed with such a device.

Figure 6:
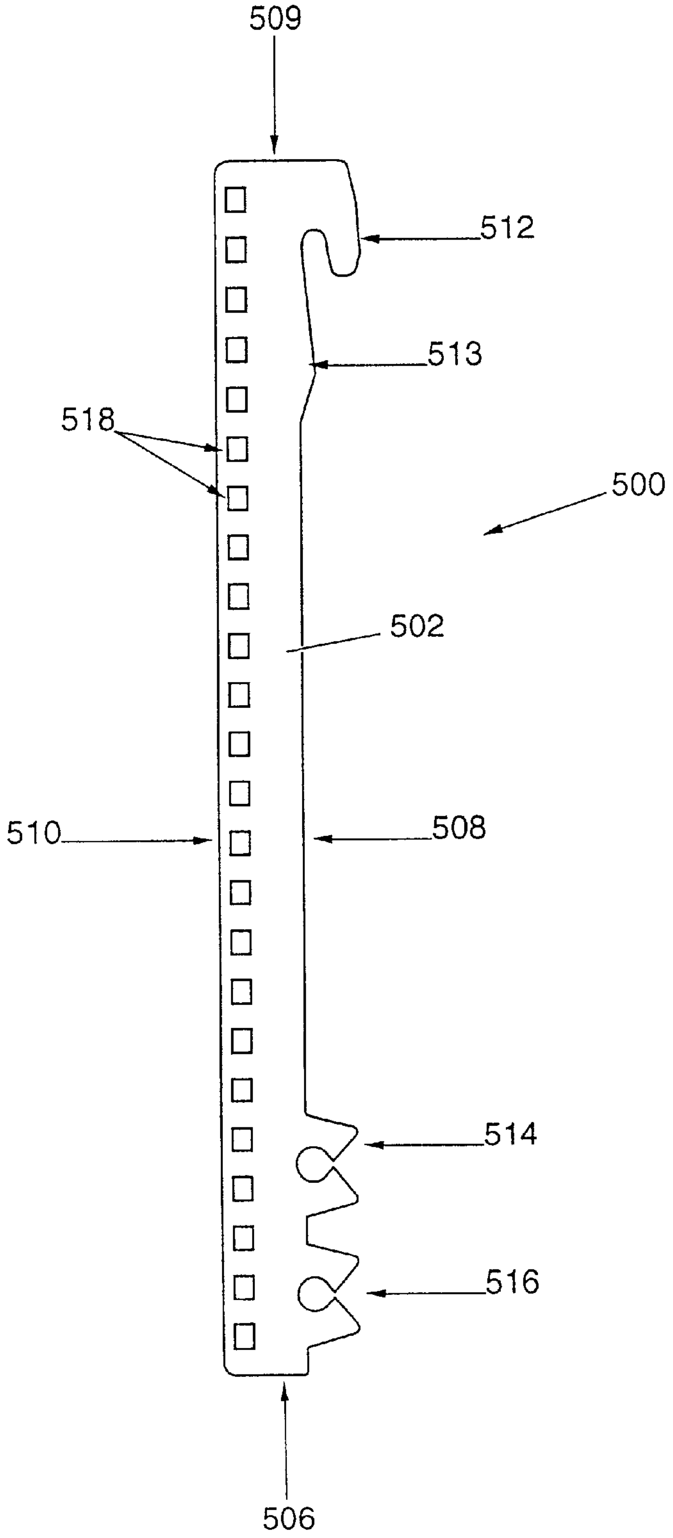
FIG. 6 is a plan view of a fifth preferred exemplary removable insert in accordance with the present invention.

Referring now to FIG. 6, a fifth preferred exemplary embodiment of a removable insert is shown generally at 500. This preferred embodiment includes a thin body member 502 having first and second ends 504 and 506 and longitudinal edges 508 and 510 extending therebetween. The removable insert includes a hooking element 512 and a stabilizing shoulder 513 disposed towards the first end 504 and a pair of fasteners 514 and 516 disposed towards the second end 506, all of which extend laterally from longitudinal edge 508.

As with other fasteners discussed herein, it is preferable that fasteners 514 and 516 be spaced apart from the hooking element at a predetermined distance such that, upon rotation of the hooking element about a page retaining member, the fasteners may be moved into engagement with page retaining members.

Insert 500 also includes a plurality of evenly spaced apertures 518 positioned adjacent to and extending along longitudinal edge 510. Apertures 518 are provided in order that a spiral ring-type binder may be attached thereto for removable insertion within a larger ring-type binder. Notably, the distance between edges 508 and 510 is relatively small thereby providing room in within the "four corners" of the larger binder for the device to be attached thereto. Those skilled in the art will understand that apertures 518 may be alternatively sized, spaced or configured to suit the requirements of the device to be attached. Those skilled in the art will also appreciate that other means for attaching supplemental devices may be used.

Figure 7:
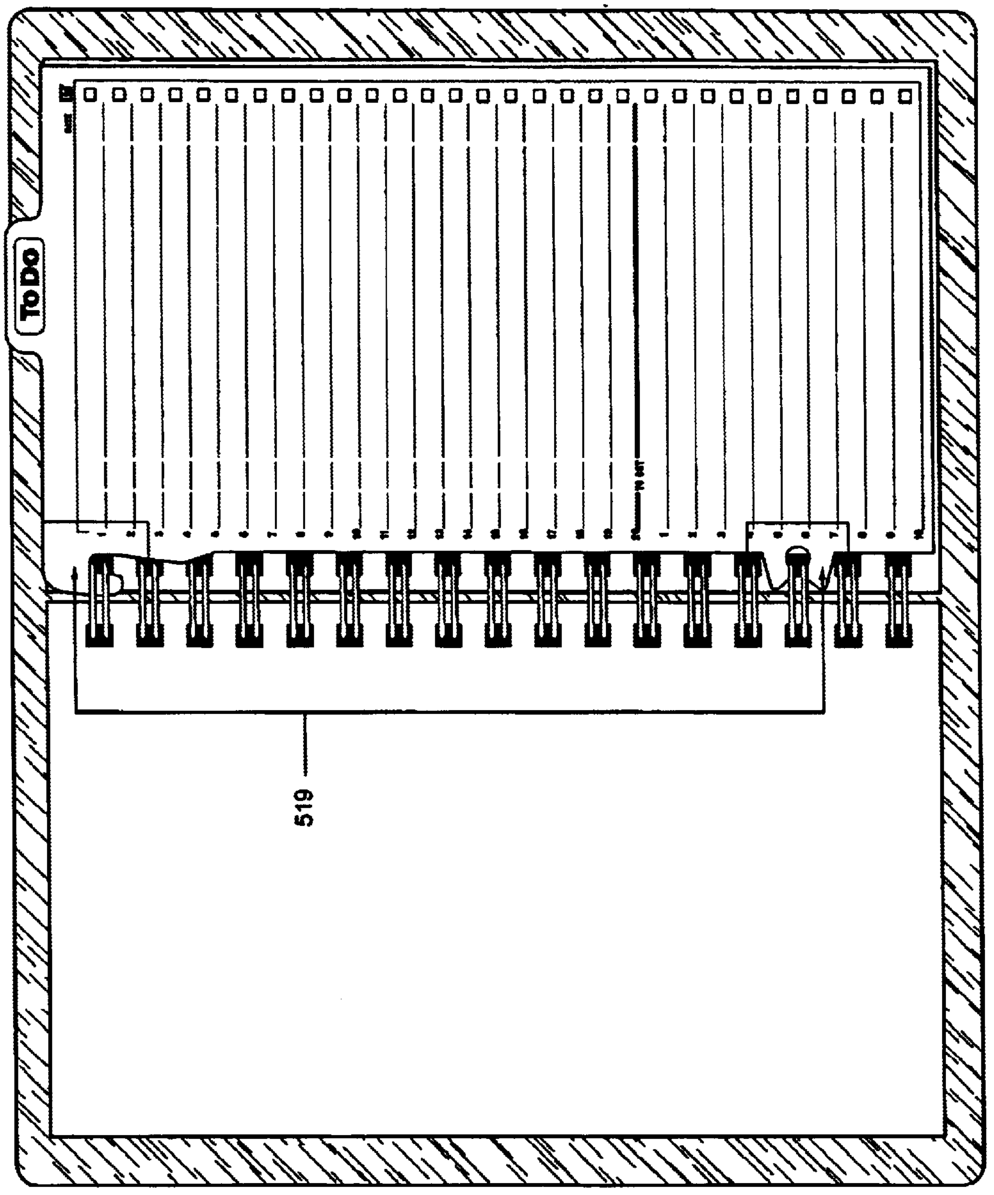
FIG. 7 is a plan view of a sixth preferred exemplary removable insert in accordance with the present invention employed with a sheet of paper and a wire ring type binder.

Referring now to FIG. 7, a sixth preferred exemplary embodiment is shown with a thin mylar 519 or similar material bonded to a paper page and then die cut to form a configuration the same as the other previous embodiments. By reinforcing a paper page as thin as 0.003 inches, the page can be removed and re-placed many times. (Any suitably sized thin flat writing material may be substituted for paper).

Figure 8:
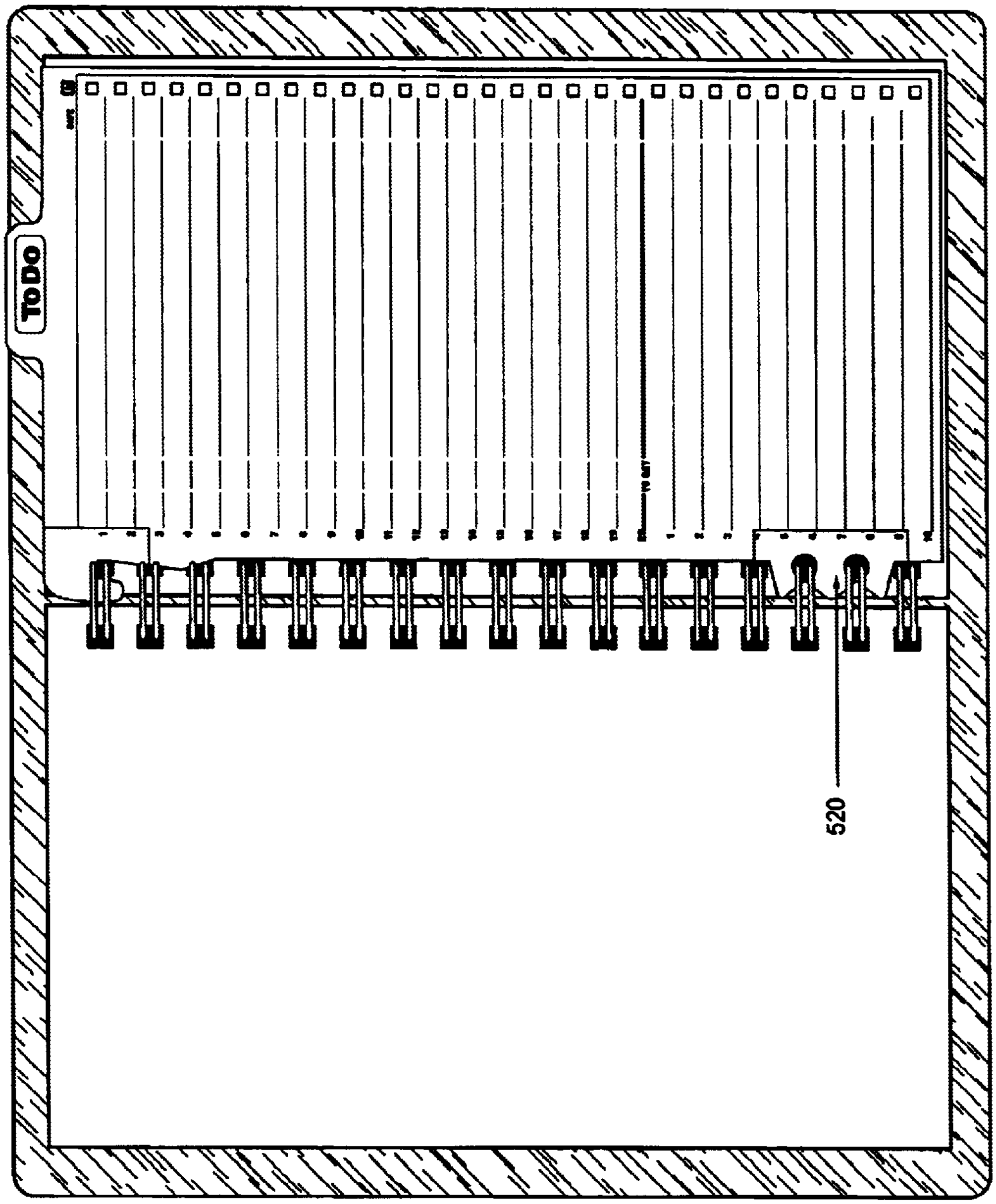
FIG. 8 is a plan view of a seventh preferred exemplary removable insert in accordance with the present invention wherein two pairs of fasteners are employed with a sheet of paper.
Figure 9:
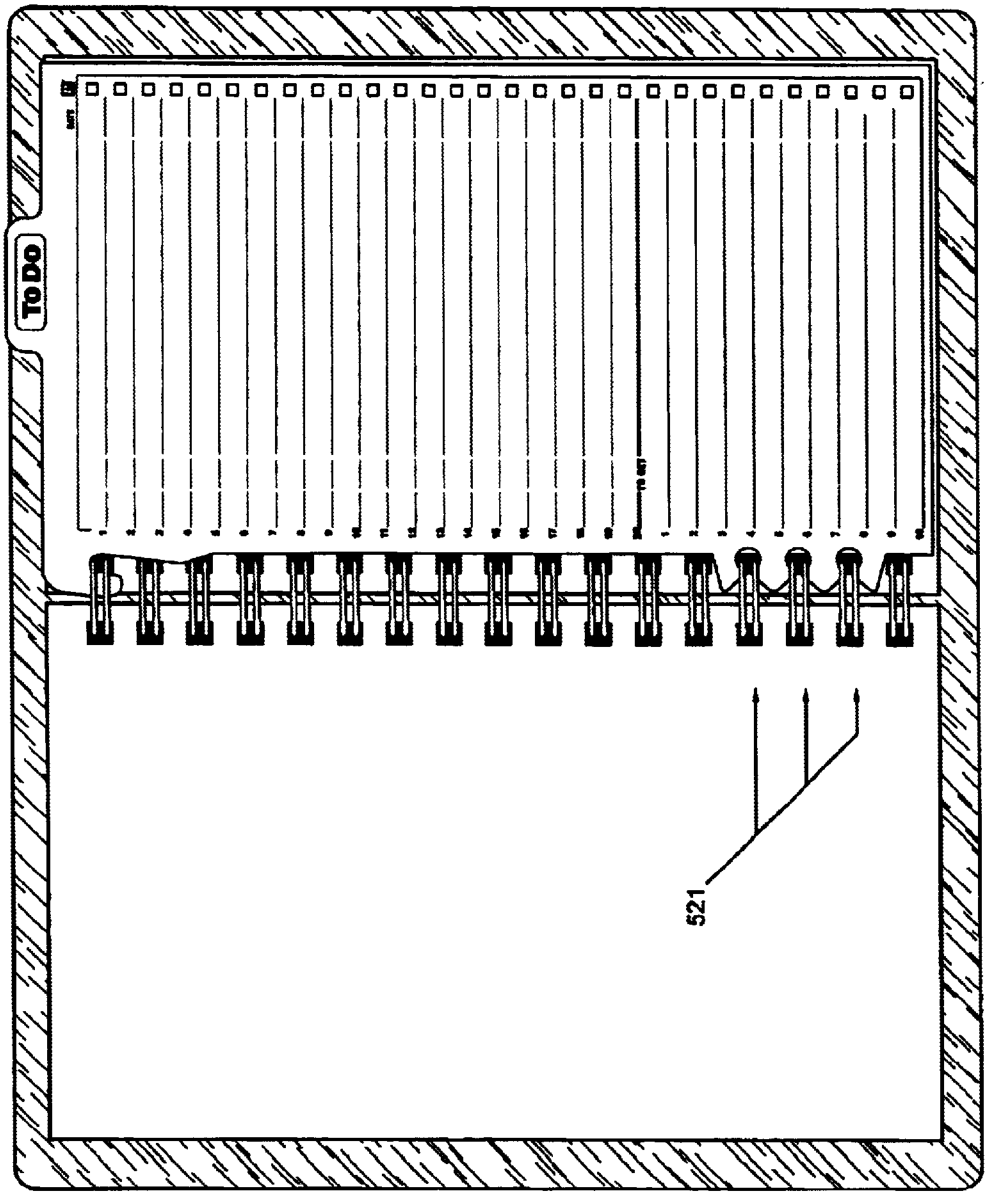
FIG. 9 is a plan view of an eighth preferred exemplary removable insert in accordance with the present invention, wherein three fastener grippers are employed with a sheet of paper with no reinforcement on the paper.

Referring now to FIG. 8, at 520, two pairs of fasteners are used for more longevity to the fasteners repetition of use, and in FIG. 9, at 521, three fastener grippers are used with no reinforcement on the paper. Papers that contain stiffeners and are as thin as 0.005 inches can be used with limited repetition. By going up to a paper with a thickness of 0.012 inches or higher, e.g., 0.030 inches, many more repetitions of insertion and removal are possible without reinforcing the paper with mylar when using this configuration 521.

Figure 10:
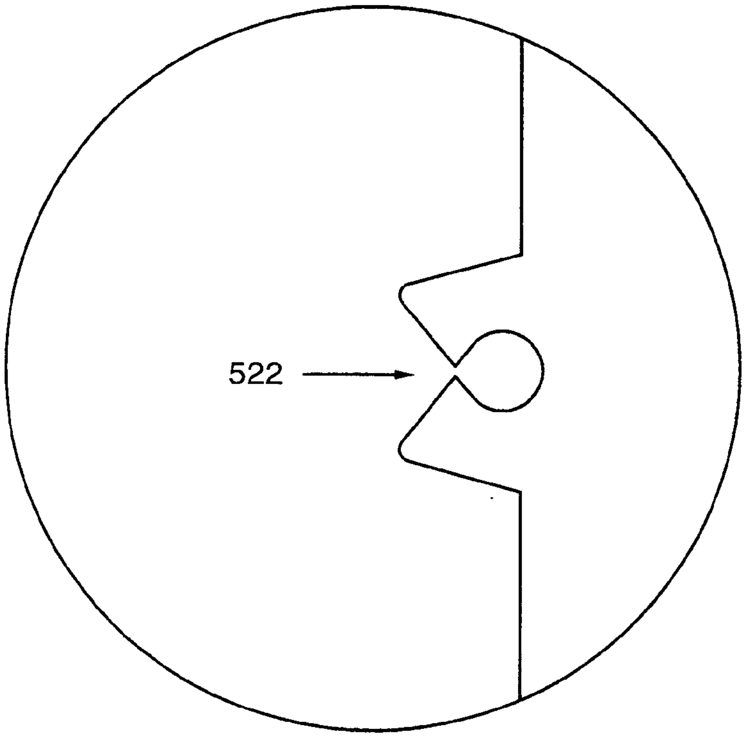
FIG. 10 shows an enlarged view showing the size of a restricted channel of a fastener gripper having an opening of about 0.025 inches and used on a plastic or other material that has a thickness of 0.003 inches to 0.010 inches.
Figure 11:
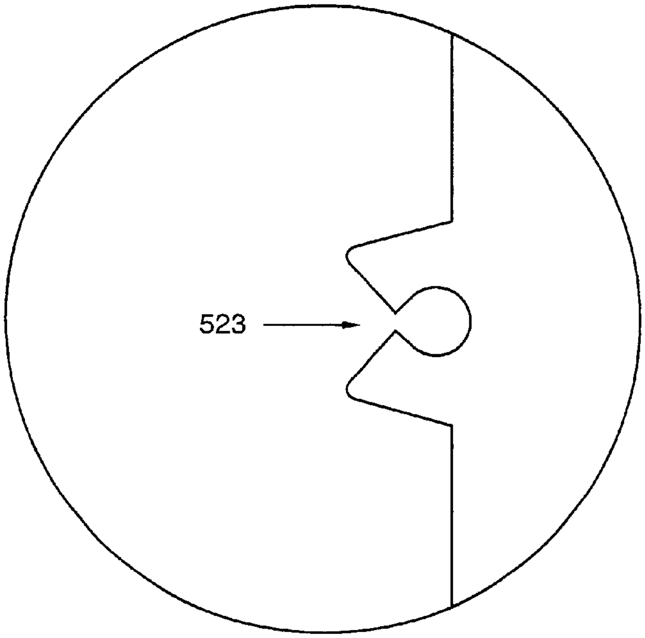
FIG. 11 shows an enlarged view showing the size of a restricted channel of a fastener gripper having an opening of about 0.040 inches and used on plastic or other materials thicker than 0.005 inches.

FIG. 10, shows the size of the restricted channel when using a plastic or other material that has a thickness of 0.003 inches to 0.010 inches. With these, the opening 522 would be approximately 0.025 inches In FIG. 11, the opening 523 is 0.040 inches and is used on materials that are thicker than 0.005 inches, e.g. 0.005 to 0.025 inches or 0.005 to 0.030 inches.

Figure 12:
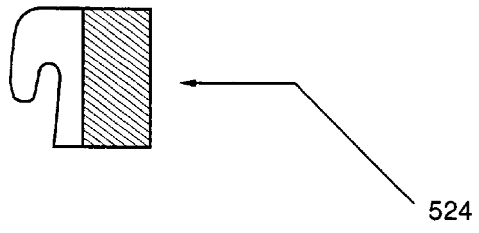
FIG. 12 shows peel off, self adhesive parts that, when placed the proper distance apart, can be attached to paper or anything that is flat and suitably sized for insertion into a binder or spiral bound book and made to be removable and insertable to a wire bound book.
Figure 12:
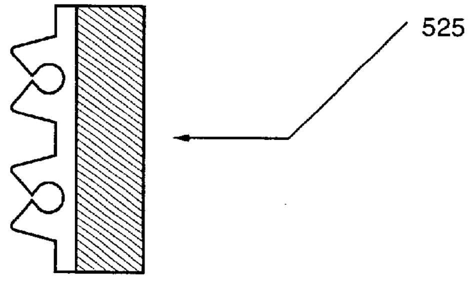

In FIG. 12, parts 524 and 525 are peel off, self adhesive parts that, when placed the proper distance apart, can be attached to anything that is flat and made to be removable and insertable to a wire bound book.

It is therefore seen that a novel apparatus and method has been provided for placing a removable insert in assembled relation to a spiral or other ring-type binder.

Although the present invention has been described in detail with regard to the preferred embodiments and drawings thereof, it should be apparent to those skilled in the art that the within disclosures are exemplary only and various other alternatives, adaptations and modifications may be accomplished but still fall within the scope and spirit of the present invention.

In particular, it will be appreciated by those skilled in the art that a fastener for detachably securing a page retaining member in accordance with the present invention may be configured other than as shown in the drawings and may consist of one or more fasteners. It will also be appreciated by those skilled in the art that a fastener in accordance with the present invention need only be flexible if the corresponding page retaining member does not have sufficient pliancy to enable the operator to position a preferred insert with a ring-type binder in the manner described above. Those skilled in the art will also appreciate that a hooking element in accordance with the present invention may be upwardly or downwardly extending and that the hooking element, the fasteners, and the protruding tab need not be integrally formed with the body member.

Accordingly, the scope of the present invention is not limited to the specific embodiment as illustrated herein, but is limited only by the following claims and equivalents thereof.

What is claimed is:

1. A removable insert adapted for use with a spiral or other ring-type binder having a plurality of page retaining members positioned longitudinally between first and second longitudinally opposing ends of said binder, comprising:

- a thin body member having first and second opposing longitudinal ends corresponding to said first and second opposing ends of said binder and a longitudinal edge extending longitudinally between said first and second longitudinal ends of said body member;
- a hooking element connected to, or integral with, said body member, said hooking element defining a longitudinally extending recess configured to receive at least a first said page retaining member in loose fitting relation, said longitudinally extending recess having opposed open and closed longitudinal ends, said closed end of said longitudinally extending recess relatively proximal to the first end of said body member and said open end of said longitudinally extending recess relatively distal to the first end of said body member such that the open end faces towards the second end of the thin body member; and
- a fastener connected to, or integral with, said body member for detachably securing said body member to a second page retaining member, wherein said hooking element is disposed towards said first end of said insert and said fastener is disposed towards said second end of said insert, said fastener defining a recess including an enlarged portion for receiving said second page retaining member in a loose fitting relation and a laterally extending constricted channel through which said second page retaining member is only laterally passable into said recess by flexion of said fastener or said second page retaining member.

2. The removable insert according to claim 1, wherein at least a portion of said longitudinally extending recess is defined by a journal bearing about which said insert is rotatable and wherein said fastener is spaced apart at a predetermined distance from said journal bearing such that, upon rotation of said insert about said journal bearing, said fastener is movable into engagement with said second page retaining member.

3. The removable insert according to claim 1, wherein said thin body element is made of a sheet of paper and said hooking element and said fastener are bonded to the sheet of paper.

4. The removable insert according to claim 1, further comprising a tab connected to, or integral with, said body member configured to extend beyond at least one perimetral edge of a page of said binder.

5. The removable insert according to claim 1, wherein said hooking element has a laterally extending L-shape comprising a laterally extending portion and an arm extending longitudinally, from the laterally extending portion, distally away from the first end of the thin body member, to define, together with a portion of the edge, the longitudinally extending recess to have a U-shape, the open end of the U-shaped longitudinally extending recess being relatively distal to the first end of the body member and the closed end of the U-shaped longitudinally extending recess being relatively proximal to the first end of the body member such that the open end of the U-shaped longitudinal channel of the hooking element faces towards the fastener.

6. The removable insert according to claim 1, wherein a portion of the edge between the hooking element and the fastener comprises a shoulder in the vicinity of the hooking element which extends outwardly from the edge for gently pressing against at least one page retaining member when the insert is positioned within a binder.

7. The removable insert according to claim 1, wherein said fastener is spaced apart from a portion of said longitudinally extending recess such that, upon rotation of said insert about the received first retaining member when the received first retaining member contacts the closed end, said fastener is movable into engagement with said second page ing member.

8. A removable insert adapted for use with a spiral or other ring-type binder having a plurality of page retaining members positioned longitudinally between opposing longitudinal ends of said binder, comprising:

- a thin body member, having first and second opposing longitudinal ends corresponding to said first and second opposing ends of said binder and an edge extending longitudinally between said first and second longitudinal ends of said body member;
- a hooking element connected to, or integral with, said body member, said hooking element defining a longitudinally extending recess configured to receive at least a first page retaining member, said longitudinally extending recess having opposed open and closed longitudinal ends, said closed end of said longitudinally extending recess relatively proximal to the first end of said body member and said open end of said longitudinally extending recess relatively distal to the first end of said body member such that the open end faces towards the second end of the thin body member; and
- a fastener connected to, or integral with, said body member configured to detachably secure said body member to a second page retaining member, wherein said hooking element is disposed towards said first end of said insert and said fastener is disposed towards said second end of said insert, wherein said longitudinally extending recess is configured to receive said first page retaining member in a loose fitting relation, wherein said fastener is spaced apart from a portion of said longitudinally extending recess such that, upon rotation of said insert about the received first retaining member, said fastener is movable into engagement with said second page retaining member, wherein said hooking element and said fastener each extend laterally from said edge sufficiently to provide a clearance for any page retaining members positioned between said hooking element and said fastener when said insert is in assembled relation to said binder.

9. The removable insert according to claim 8, wherein said fastener comprises a laterally extending L-shaped finger including a detent and defining a U-shaped recess having opposed open and closed longitudinal ends, the open end of the U-shaped recess being relatively distal to the second end of the body member and the closed end of the U-shaped recess being relatively proximal to the second end of the body member such that the open end of the longitudinal channel of the hooking element faces the open end of the U-shaped recess.

10. The removable insert according to claim 8, wherein said longitudinally extending recess includes a divergent opening for receiving said first page retaining member within said recess.

11. The removable insert according to claim 8, wherein said hooking element has an L-shape defined by a hook lateral leg protruding from the thin body member and a hook longitudinal leg protruding from the hook lateral leg, to define a U-shaped hook channel having said opposed open and closed longitudinal ends with the longitudinal leg therebetween, the open end of the U-shaped hook channel being relatively distal to the first end of the body member and the closed end of the U-shaped hook channel being relatively proximal to the first end of the body member such that the open end of the longitudinal channel is defined by the hooking element and faces towards the fastener.

12. The removable insert according to claim 8, wherein said fastener defines a key shaped opening comprising an enlarged portion for receiving said second page retaining member in a loose fitting relation and a laterally extending constricted channel.

13. The removable insert according to claim 8, wherein said fastener defines a recess including an enlarged portion for receiving said second page retaining member in a loose fitting relation and a laterally extending constricted channel through which said second page retaining member is only passable by flexion of said fastener or said second page retaining member.

14. The removable insert according to claim 8, wherein said hooking element and said fastener are integrally formed with said thin body member.

15. The removal insert according to claim 8, wherein said thin member, said hooking element and said fastener are flexible.

16. The removable insert according to claim 8, further comprising a tab connected to, or integral with, said body member configured to extend beyond at least one perimetral edge of said binder.

17. The removable insert according to claim 8, wherein said thin member comprises a sheet of paper and the hook and fastener are attached to the sheet of paper.

18. The removable insert according to claim 8, wherein said thin member comprises a paper body member and a reinforcement bonded to the paper body member that is cut to form said hooking element and said fastener.

19. The removable insert according to claim 8, further comprising a mylar or similar reinforcement bonded to a paper body member that is cut to form a hooking element and fastener.

20. The removable insert according to claim 8, wherein the insert along a transverse side opposed to the edge has a plurality of evenly spaced apertures for receiving a spiral ring.

21. The removable insert according to claim 8, wherein said fastener comprises a laterally extending finger including a detent and defining a recess having opposed open and closed longitudinal ends, the open end of the recess being relatively distal to the second end of the body member and the closed end of the recess being relatively proximal to the second end of the body member such that the open end of the longitudinal channel of the hooking element faces the open end of the recess.

22. The removable insert according to claim 8, wherein said fastener is spaced apart from a portion of said longitudinally extending recess such that, upon rotation of said insert about the received first retaining member when the received first retaining member contacts the closed end, said fastener is movable into engagement with said second page retaining member.

23. The removable insert according to claim 8, wherein at least a portion of said longitudinally extending recess is defined by a journal bearing about which said insert is rotatable and the fastener is spaced apart from said journal bearing such that, upon rotation of said insert about said journal bearing, said fastener is movable into engagement with said second page retaining member.

24. The removable insert according to claim 8, wherein the insert has at most one said fastener disposed towards the second end of the insert.

25. The removable insert according to claim 9, wherein said hooking element has a laterally extending L-shape comprising a laterally extending portion and an arm extending longitudinally, from the laterally extending portion, distally away from the first end of the thin body member, to define, together with a portion of the edge, the longitudinally extending recess to have a U-shape, the open end of the U-shaped longitudinally extending recess being relatively distal to the first end of the body member and the closed end of the U-shaped shaped longitudinally extending recess being relatively proximal to the first end of the body member such that the open end of the U-shaped longitudinal channel of the hooking element faces the open end of the U-shaped recess of the fastener.

26. The removable insert according to claim 9, wherein a first portion of the edge between the hooking element and the fastener comprises a first shoulder in the vicinity of the hooking element which extends outwardly from the edge for gently pressing against at least one page retaining member when the insert is positioned within a binder, and a second portion of the edge between the hooking element and the fastener comprises a second shoulder in the vicinity of the fastener which extends outwardly from the edge for gently pressing against at least one page retaining member when the insert is positioned within a binder.

27. The removable insert according to claim 13, wherein said fastener is flexible.

28. The removable insert according to claim 13, wherein said fastener is substantially inflexible.

29. The removable insert according to claim 13, wherein said second page retaining member is flexible.

30. The removable insert according to claim 29, wherein each of said page retaining members comprises two or more spaced apart members.

31. The removable insert according to claim 13, wherein said constricted channel diverges at each end thereof to facilitate insertion of said second page retaining member into said enlarged portion and to facilitate removal of said second page retaining member from said enlarged portion.

32. The removable insert according to claim 13, wherein the insert has at most one said fastener disposed towards the second end of the insert.

* * * * *